(12) United States Patent
Sekino et al.

(10) Patent No.: US 7,099,874 B2
(45) Date of Patent: Aug. 29, 2006

(54) INQUIRY RESPONDING APPARATUS AND METHOD, AND PROGRAM USED THEREWITH

(75) Inventors: Masaaki Sekino, Kanagawa (JP); Masayoshi Yamamichi, Kanagawa (JP); Hiroji Noguchi, Kanagawa (JP); Yukio Kuroshita, Kanagawa (JP); Kazuto Nishimura, Kanagawa (JP); Takahiro Isobe, Chiba (JP); Makoto Yoshie, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 540 days.

(21) Appl. No.: 10/419,747

(22) Filed: Apr. 22, 2003

(65) Prior Publication Data

US 2003/0204506 A1    Oct. 30, 2003

(30) Foreign Application Priority Data

Apr. 25, 2002 (JP) ............................. 2002-124134

(51) Int. Cl.
  G06F 7/00   (2006.01)
  G06F 17/30  (2006.01)
  G06F 17/00  (2006.01)
(52) U.S. Cl. ................................. 707/10; 707/3; 707/4
(58) Field of Classification Search ................. 707/10, 707/3, 4
See application file for complete search history.

(56) References Cited

U.S. PATENT DOCUMENTS

| 5,987,452 A * | 11/1999 | Kung ............................. 707/4 |
| 6,401,087 B1 * | 6/2002 | Yanagimoto .................... 707/5 |
| 2003/0018468 A1 * | 1/2003 | Johnson et al. ................ 704/8 |
| 2003/0149686 A1 * | 8/2003 | Drissi et al. ................... 707/3 |

* cited by examiner

Primary Examiner—Frantz Coby
Assistant Examiner—Cindy Nguyen
(74) Attorney, Agent, or Firm—Fitzpatrick, Cella, Harper & Scinto.

(57) ABSTRACT

An inquiry respondinq apparatus receives an inquiry and stores a response to the inquiry in a first database. The apparatus determines whether or not the first database can be searched for the response to the inquiry, and when it is determined that the first database can be searched for the response to the inquiry, and when it is determined that the first database can be searched, a search for the response is performed. However, when it is determined that the first database cannot be searched, the apparatus transmits the inquiry to an external information processing device, and the apparatus receives a response to the inquiry which is transmitted from the external information processing device. Then, one of the response obtained by searching the first database and the response received from the external device is displayed on a display.

7 Claims, 12 Drawing Sheets

FIG. 6

INQUIRIES

PRINTERS

○ QUESTIONS ABOUT
  GENERAL INFORMATION
  CONCERNING PRINTERS

○ x x PRINTER (PRN-056)  ~601

○ x x PRINTER (PRN-057)

○ x x PRINTER (PRN-600)

○ x x PRINTER (PRN-700)

○ x x PRINTER (PPP-123)

○ x x PRINTER (PPP-156)

INQUIRY RESPONDING APPARATUS AND METHOD, AND PROGRAM USED THEREWITH

BACKGROUND OF THE INVENTION

1. Field of the Invention

The present invention relates to inquiry responding apparatuses and methods, and programs used therewith, and in particular, to an inquiry responding apparatus and method in which responses to inquiries are stored in internal and external databases, and a program used therewith.

2. Description of the Related Art

In order that an enterprise may efficiently respond to inquiries from customers, an inquiry responding system has conventionally been proposed which uses a World Wide Web (WWW) browser to receive inquiries and respond (reply) thereto.

This inquiry responding system is realized by using a single (common) database. Thus, when the system has possible responses which are geographically different, it has the following problems:

(1) The common database must be updated despite the geographically different responses (replies) in the system;
(2) A customer must use the system while being aware of which region each customer belongs to; and
(3) The use and handling of languages are complicated.

SUMMARY OF THE INVENTION

According to an aspect of the present invention, an inquiry responding apparatus is provided which includes a receiving unit for receiving an inquiry, a first database for storing a response to the inquiry, a determining unit for determining whether or not the first database can be searched for the response to the inquiry, a searching unit for searching the first database for the response to the inquiry when the determining unit determines that the first database can be searched, a transmitting unit for transmitting the inquiry to an external information processing device when the determining unit determines that the first database cannot be searched, a second receiving unit for receiving a response to the inquiry which is transmitted from the external information processing device, and a displaying unit for displaying one of the response obtained by the searching unit and the response received by the second receiving unit.

According to another aspect of the present invention, an inquiry responding apparatus having at least two databases respectively storing responses to one inquiry is provided. The apparatus includes a database selecting unit for selecting one database from the at least two databases, a first inquiry-receiving unit for receiving an inquiry, a searching unit for searching the selected database for a response to the received inquiry, a transmitting unit for transmitting the response obtained by the searching unit, a second inquiry-receiving unit for receiving further inquiries about the transmitted response, an inquiry-counting unit for counting the number of times a further inquiry is received, and a database changing unit for selecting a database other than the selected database when the number of times a further inquiry is received exceeds a predetermined number.

According to another aspect of the present invention, an inquiry responding method is provided which includes a receiving step of receiving an inquiry, a determining step of determining whether or not a first database which stores a response to the inquiry can be searched for the response, a searching step of searching the first database for the response to the inquiry when it is determined by the determining step that the first database can be searched, a transmitting step of transmitting the inquiry to an external information processing device when it is determined by the determining step that the first database cannot be searched, a second receiving step of receiving a response to the inquiry which is transmitted from the external information processing device, and a displaying step of displaying one of the response obtained in the searching step and the response received in the second receiving step.

According to yet another aspect of the present invention, an inquiry responding program is provided which includes a receiving step of receiving an inquiry, a determining step of determining whether or not a first database storing a response to the inquiry can be searched for the response, a searching step of searching the first database for the response to the inquiry when it is determined by the determining step that the first database can be searched, a transmitting step of transmitting the inquiry to an external information processing device when it is determined by the determining step that the first database cannot be searched, a second receiving step of receiving a response to the inquiry which is transmitted from the external information processing device, and a displaying step of displaying one of the response obtained in the searching step and the response received in the second receiving step.

Other features and advantages of the present invention will be apparent from the following description taken in conjunction with accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

FIG. 6 is an illustration of a displayed screen including questions about general information of printers and selectable printers.

DESCRIPTION OF THE PREFERRED EMBODIMENT

A preferred embodiment of the present invention is described below with reference to the accompanying drawings.

Figure 1:
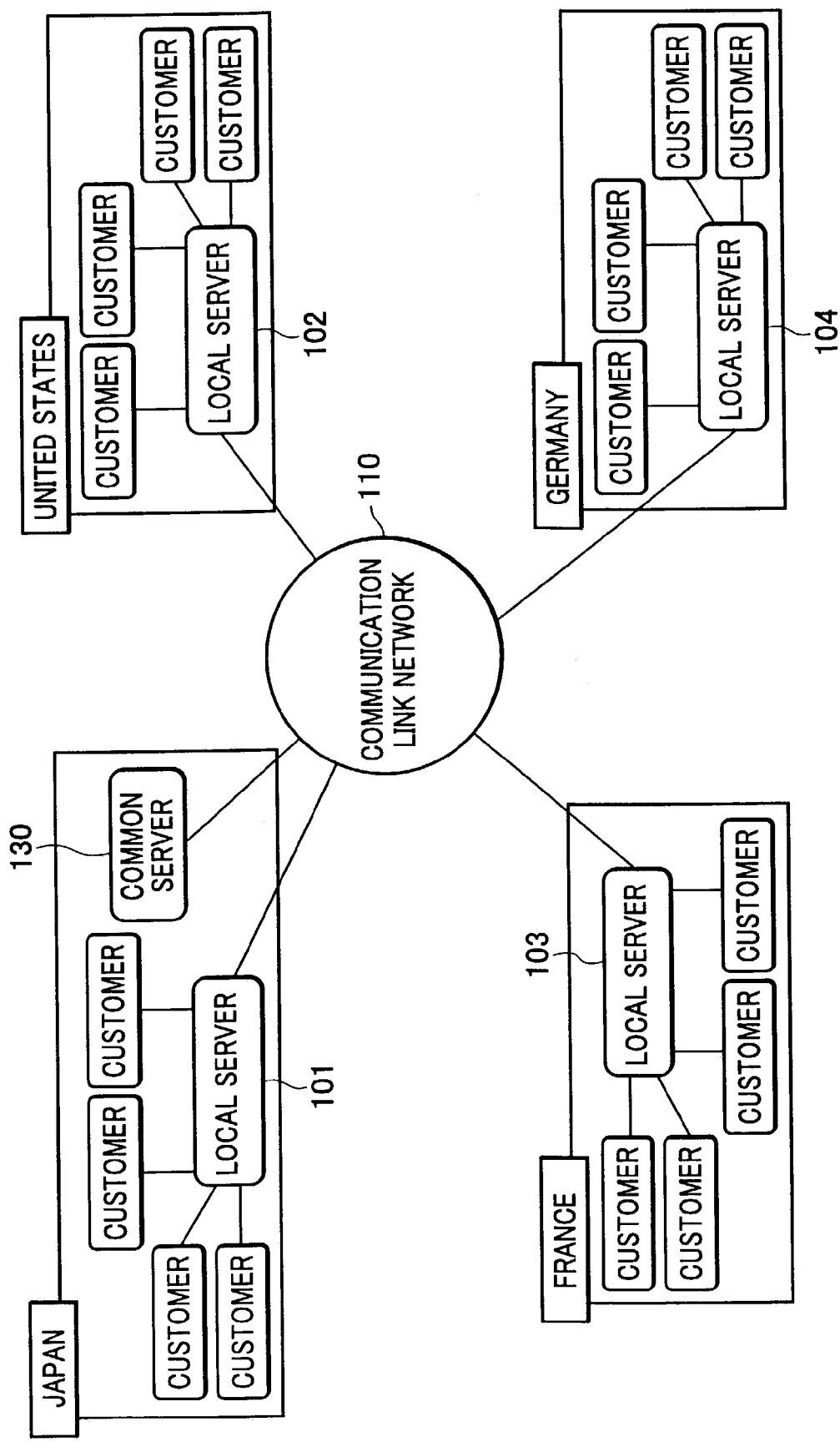
FIG. 1 is a block diagram schematically illustrating a system in an embodiment of the present invention.

FIG. 1 shows the entirety of an inquiry responding system according to an embodiment of the present invention.

Local servers 101 to 104, located in countries (e.g., Japan, United States, France, and Germany), can communicate with one another by a communication link network 110.

Customers' terminals in each country can also communicate with each local server by a communication link network (not shown).

A common server 130 can communicate with the local servers 101 to 104 in the various countries by the communication link network 110.

The communication link network 110 is realized by the Internet and a wide area network (WAN). In FIG. 1, customers' terminals in those countries are connected to the local servers 101 to 104 in the countries. The connections are realized by the Internet (not shown) or the like.

Although FIG. 1 shows Japan, United States, France, and Germany, instead of using units of countries, for example, units of local authorities and units of sales districts may be used. Also, although the server 130 is installed in Japan, it may be installed not in Japan but in another country or may be installed in a country which is not shown.

Figure 2:
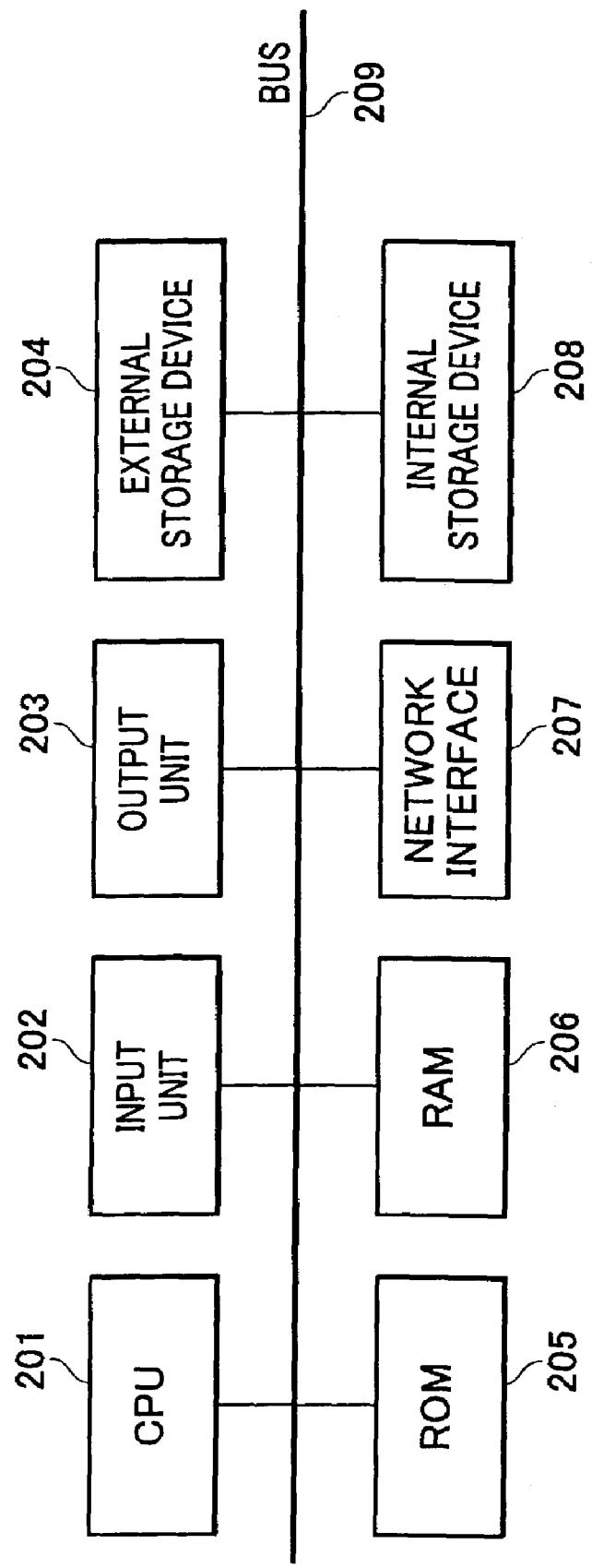
FIG. 2 is a block diagram showing the structure of each of the local servers.

FIG. 2 is a block diagram showing the structure of each of the local servers 101 to 104.

A central processing unit (CPU) 202 not only controls each unit of the local server, but also performs control for implementing processes in this embodiment.

An input unit 202 enables an operator to input information. The input unit 202 includes, for example, a keyboard, a mouse, and a digitizer.

An output unit 203 displays information for the operator. The output unit 203 includes, for example, a cathode-ray tube or a liquid crystal display.

An external storage device 204 is separated from the local server and is used for reading and writing of information. For example, a hard disk drive, a floppy disk drive, a magneto-optical disk drive, a CD-R drive, or a storage device which is substantially at a distance from the local server is used as the external storage device 204.

A read-only memory (ROM) is divided into two types, a programmable ROM in which a program can be electrically written by a user and a mask ROM in which its content is written when it is produced. In this embodiment, either type of ROM may be used as the ROM 205.

In a random access memory (RAM) 206, information can be freely written and read. The RAM 206 is used as a work memory for data input and output and data transmission and reception and as a temporary storage region for a program which controls system components.

A network interface 207 enables a link to the Internet or a network such as a local area network (LAN) or WAN. The network interface 207 includes, for example, a modem and a network card. Also, communication is implemented by a network protocol such as Transmission Control Protocol/Internet Protocol (TCP/IP).

An internal storage device 208 stores various types of data. The internal storage device 208 includes, for example, a hard disk.

A bus 209 is used to exchange various types of data between two blocks in the local server and to supply power. The bus 209 includes an address line, a data line, a control line, and a power-supply/ground line.

The operation of the local server is discussed. Computer software (hereinafter referred to as a "program") for implementing the processes in this embodiment which is stored in the internal storage device 208 or the external storage device 204 is loaded into the RAM 206. The CPU 201 executes the program stored (loaded) in the RAM 206, whereby the processes (described later) in this embodiment are implemented. Accordingly, the CPU 201 functions as all or part of various units in this embodiment (such as a receiving unit, a determining unit, a searching unit, a transmitting unit, and a display). The program is also designed for the local servers 101 to 104 to realize various steps in this embodiment (such as those performed by a receiving unit, a determining unit, a searching unit, a transmitting unit, and a displaying unit).

Figure 10:
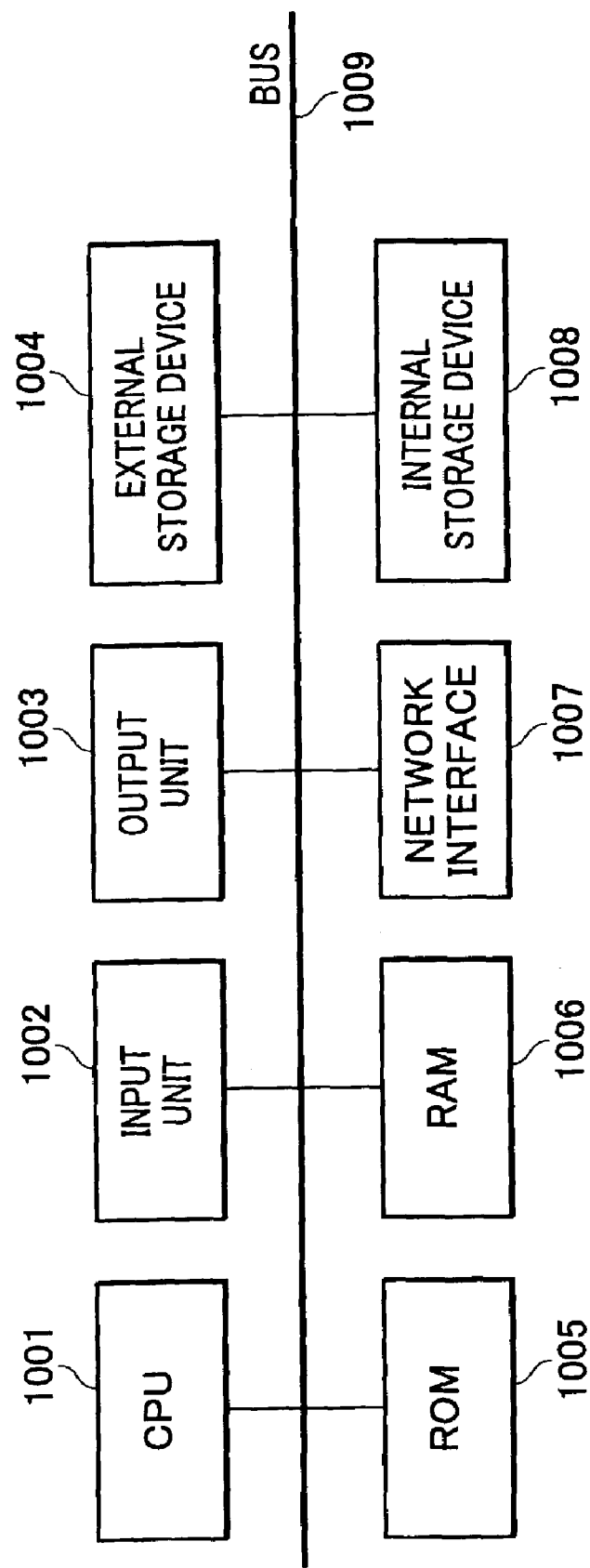
FIG. 10 is a block diagram showing the structure of a common server.

FIG. 10 is a block diagram showing an example of the common server 130.

A CPU 1001 not only controls each unit of the local server, but also performs control for implementing processes in this embodiment.

An input unit 1002 enables an operator to input information. The input unit 1002 includes, for example, a keyboard, a mouse, and a digitizer.

An output unit 1003 displays information for the operator. The output unit 1003 includes, for example, a cathode-ray tube or a liquid crystal display.

An external storage device 1004 is separated from the local server and is used for reading and writing of information. For example, a hard disk drive, a floppy disk drive, a magneto-optical disk drive, a CD-R drive, or a storage device which is substantially at a distance from the local server is used as the external storage device 1004.

A ROM is divided into two types, a programmable ROM in which a program can be electrically written by a user and a mask ROM in which its content is written when it is produced. In this embodiment, either type of ROM may be used as a ROM 1005.

In a RAM 1006, information can be freely written and read. The RAM 1006 is used as a work memory for data input and output and data transmission and reception and as a temporary storage region for a program which controls system components.

A network interface 1007 enables a link to the Internet or a network such as a LAN or WAN. The network interface 1007 includes, for example, a modem and a network card. Also, communication is implemented by a network protocol such as TCP/IP.

An internal storage device 1008 stores various types of data. The internal storage device 1008 includes, for example, a hard disk.

A bus 1009 is used to exchange various types of data between two blocks in the local server and to supply power. The bus 1009 includes an address line, a data line, a control line, and a power-supply/ground line.

The basic operation of the common server 130 is almost identical to that by the local server. Computer software (which may be identical to or different from that in the local server) for implementing the processes in this embodiment which is stored in the internal storage device 1008 or the external storage device 1004 is loaded into the RAM 1006. The CPU 1001 executes the program stored (loaded) in the RAM 1006, whereby the processes (described later) in this embodiment are implemented. Accordingly, the CPU 1001 functions as all or part of various units in this embodiment (such as a receiving unit, a determining unit, a searching unit, a transmitting unit, and a display). The program is also designed for the local servers 101 to 104 to realize various steps in this embodiment (such as a receiving step, a determining step, a search step, a transmitting step, and a display step).

Figure 3:
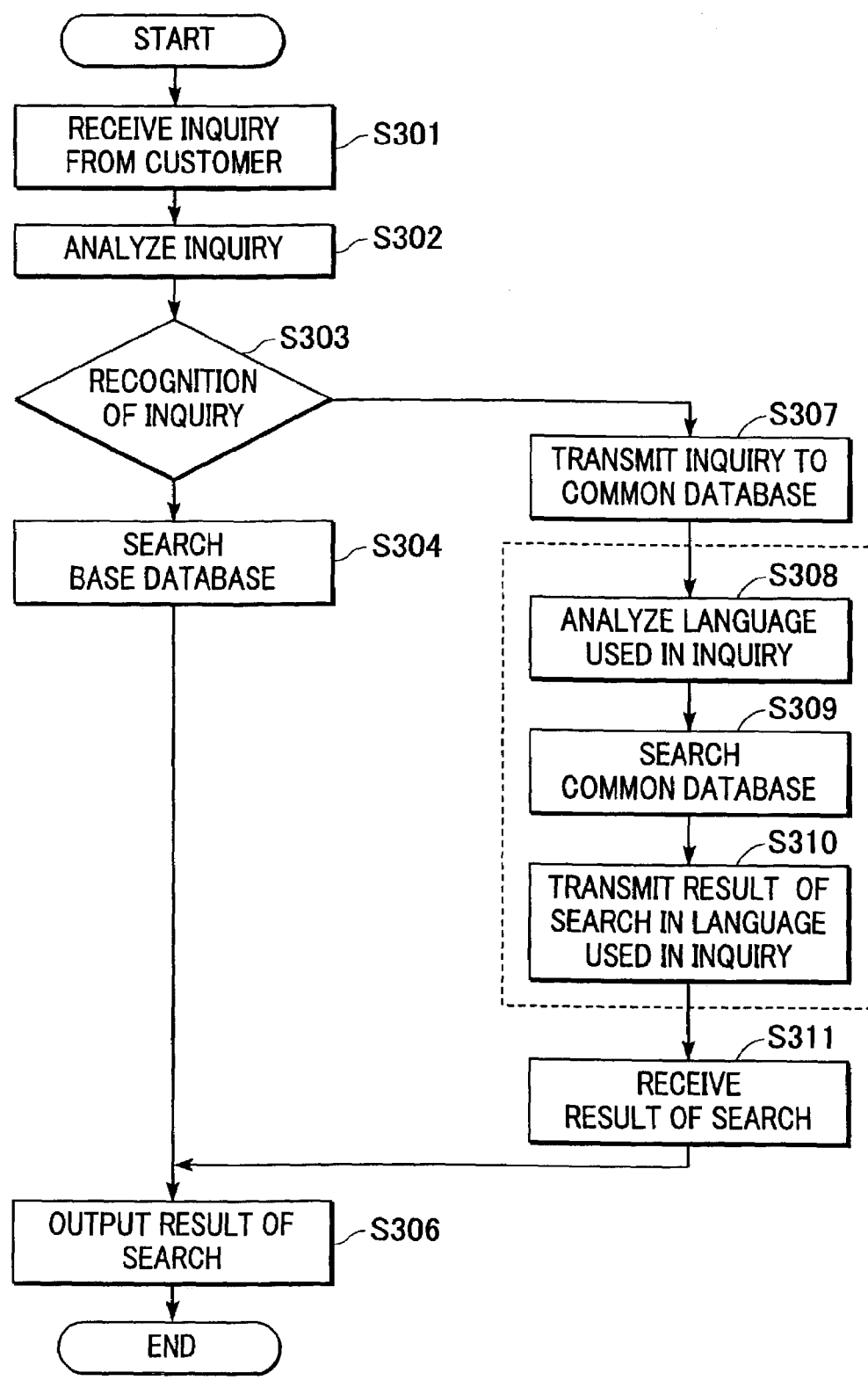
FIG. 3 is a flowchart showing a process for responding to an inquiry from a customer.

FIG. 3 shows a processing flow in the case of responding to an inquiry from a customer.

In step S301, the customer accesses a regional inquiry point (local server).

The phrase "accesses a regional inquiry point" here means that an information processing device or portable terminal (hereinafter referred to as a "customer terminal") such as a personal computer of the customer accesses a homepage set up by an enterprise. The CPU 201 (shown in FIG. 2) in the local server accessed by the customer terminal searches each storage device or the like for data associated with a request from the customer terminal, and responds to the customer terminal with the detected data.

The "region" is a region where the customer lives, or a region where the customer is positioned when being a legal entity. A customer can access the inquiry point of another region. For example, a customer living in Japan can access an inquiry point in the United States.

Figure 4:
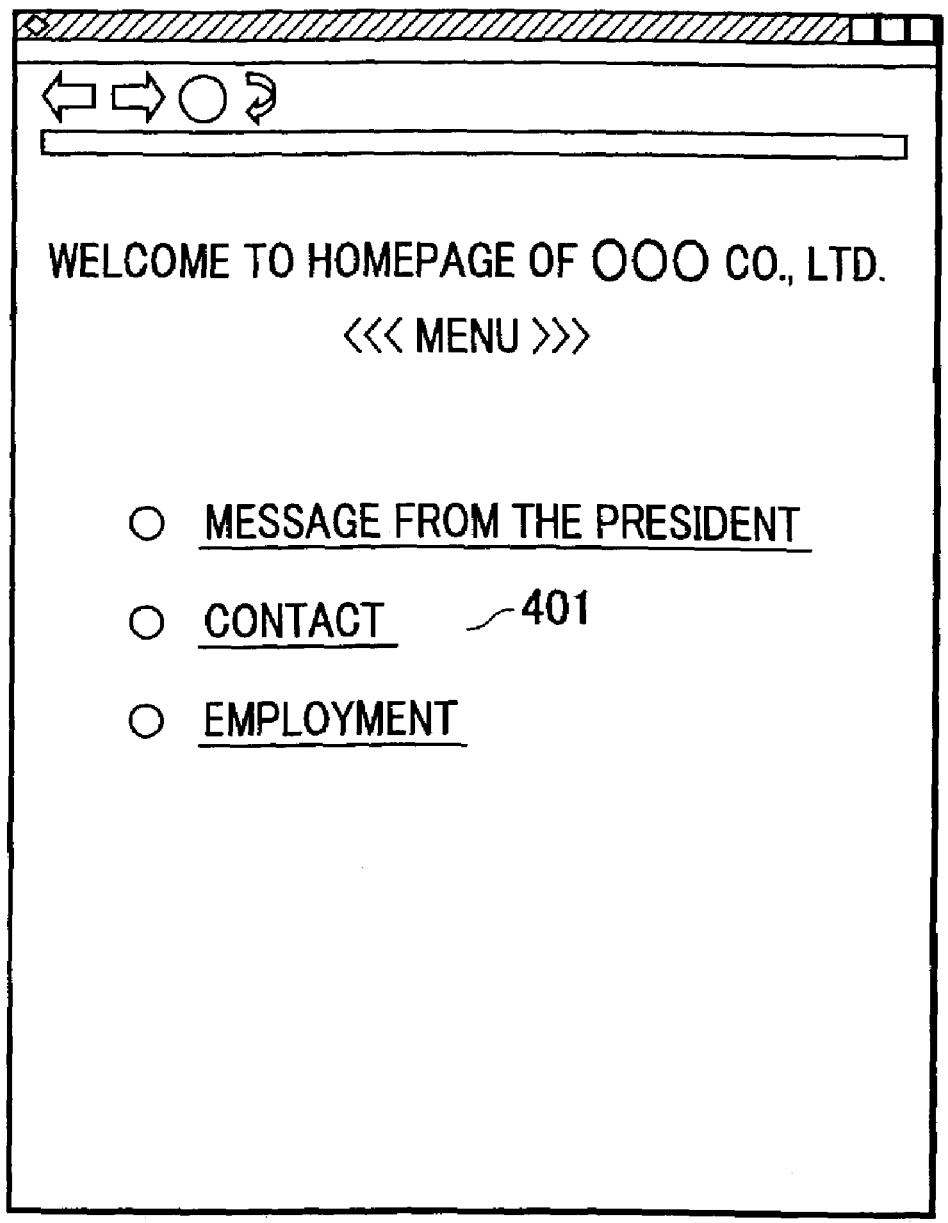
FIG. 4 is an illustration of an enterprise's homepage displayed in the browser of an information processing device or portable terminal of a customer when the customer accesses a regional inquiry point.

FIG. 4 shows a homepage displayed in the browser of a customer terminal when a customer accesses a regional inquiry point. The customer can access not only contact information but also information such as a message from the president and employment. By selecting the item "CONTACT" 401 displayed in the browser (e.g., using a mouse to click on), the customer proceeds to an inquiries screen.

Figure 5:
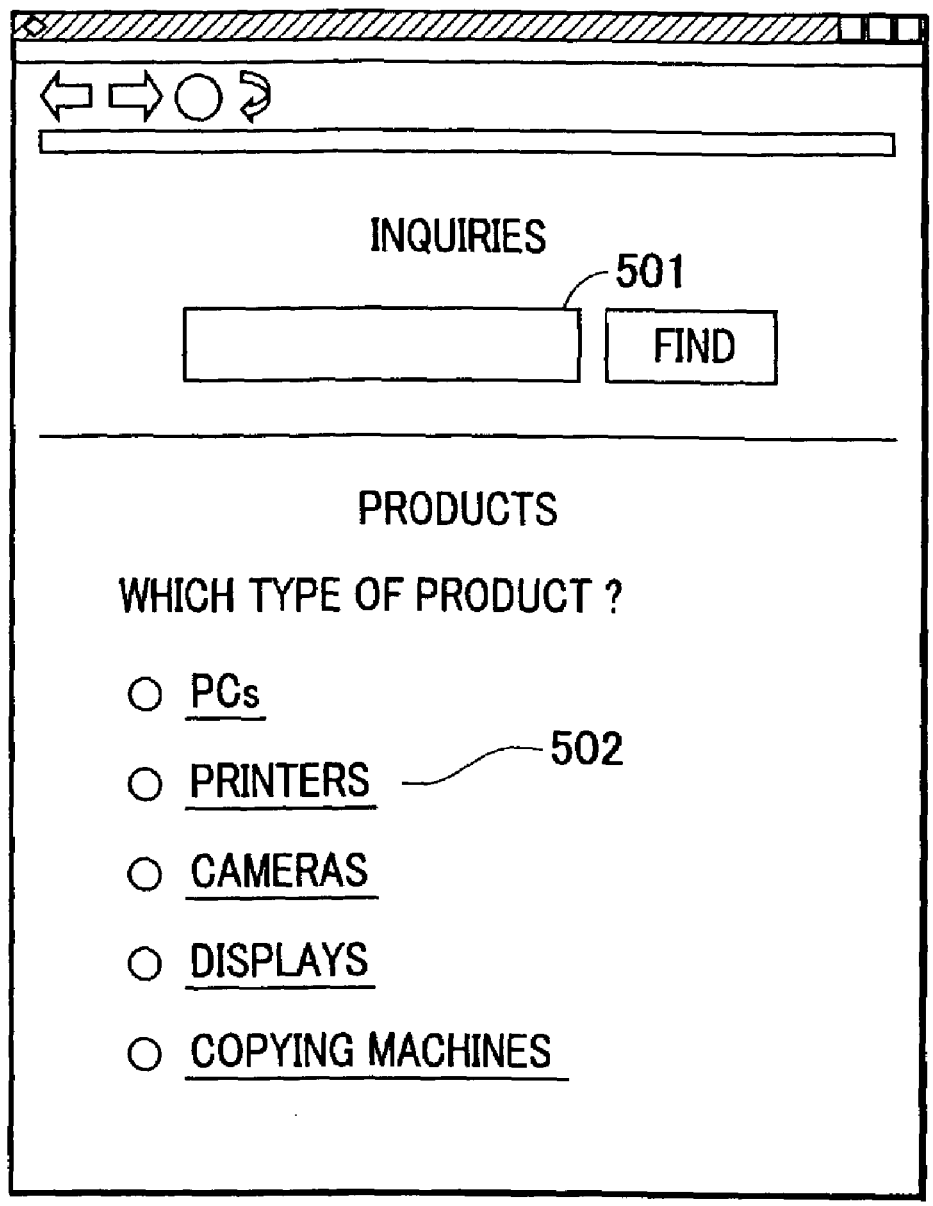
FIG. 5 is an illustration of an inquiries screen.

FIG. 5 shows the inquiries screen.

After accessing the inquiries screen, the customer uses a keyword or a link to make an "inquiry". In the process of receiving the inquiry, the inquiry from the customer is analyzed in step S302 of FIG. 3.

The keyword inquiry is an inquiry which is made by inputting from the customer a keyword to a keyword search box 501. For example, when the customer inquires about the printer driver of a XX Printer (PRN-056), he or she may input the words "PRN-056" and "driver" in the search box, with a space provided therebetween. Based on the inputted keywords, the inquiry from the customer is analyzed in step S302, and the process proceeds to an inquiry recognition step.

The keyword inquiry may be an inquiry using a natural language. For example, it is possible that, by inputting the sentence "Please let me know latest information on a driver of PRN-056" or "I want to know the newest printer driver of PRN-056", a response similar to that produced in the case of the keyword inquiry can be obtained.

The inquiry with a link is a technique in which, by sequentially displaying selectable items in the homepage, the inquiry from the customer is specified. For example, when the customer will make an inquiry about a printer driver for XX Printer (PRN-056), he or she may select the item "PRINTERS" 502 (e.g., by using a mouse to click on) instead of inputting a keyword into the search box, as described above.

FIG. 6 shows a displayed screen having the item "QUESTIONS ABOUT GENERAL INFORMATION OF PRINTERS" and items indicating selectable printers.

The customer selects XX Printer (PRN-056) from among the selectable printers (e.g., by using the mouse to click on).

Figure 7:
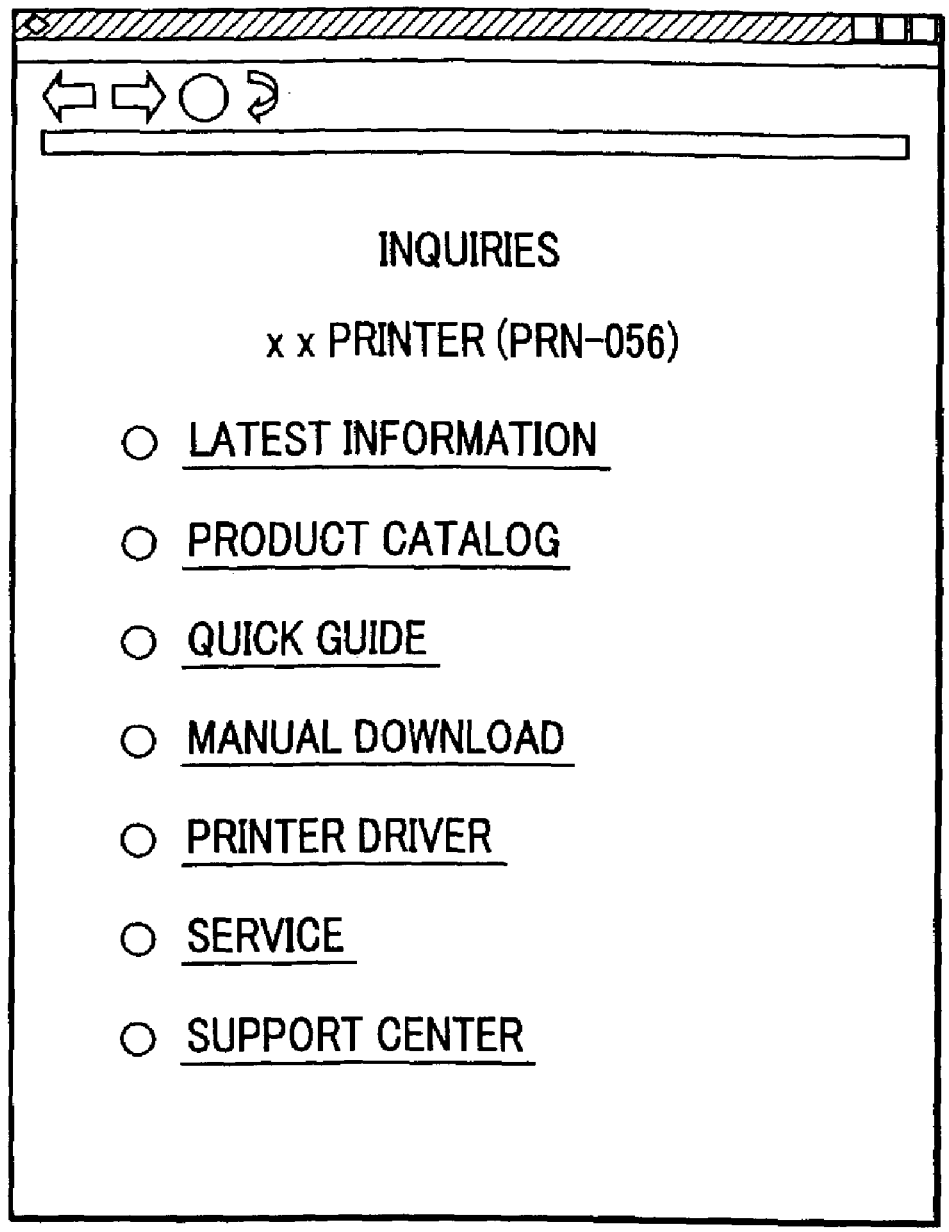
FIG. 7 is an illustration of an inquiry menu for XX Printer (PRN-056).

FIG. 7 shows an inquiry menu of XX Printer (PRN-056).

In response to selection by the customer of the item "PRINTER DRIVER" from the displayed menu (e.g., by using the mouse to click on), in step S302, the CPU 201 analyzes the inquiry from the customer and finds that it relates to XX Printer (PRN-056).

The inquiry with the link is not limited to the order from FIG. 4 to FIG. 7. For example, after the inquiries screen in FIG. 7 is displayed, the screen in FIG. 5 may be displayed.

Based on the content of the inquiry analyzed in step S302, in step S303, the CPU 201 determines whether it should respond (reply) by using the database of the local server 101, 102, 103, or 104 or it should respond (reply) by the database of the common server 130.

The details of inquiries to which the database of the common server 130 should respond are as follows:
automatic trouble shooting;
FAQs common in regions;
product information (product specifications, etc.);
Quick Start Guide;
manual;
driver information; and
firmware information;

The details of inquiries to which the database of the local server 101, 102, 103, or 104 should respond are as follows:
contact information of service bases (addresses, telephone numbers, e-mail addresses, etc.);
FAQs unique to each region;
product information (marketing information, etc.);
price list; and
electronic commerce.

Obviously, the details of inquiries to which the database of the common server 130 should respond, and the details of inquiries to which the database of the local server 101, 102, 103, or 104 should respond are not limited to the above enumerated items.

The details of inquiries to which the database of the common server 130 should respond may overlap with the details of inquiries to which the database of the local server 101, 102, 103, or 104 should respond. In this case, by beforehand determining which database should be used, a problem of producing two responses to one inquiry can be eliminated.

The databases of the local servers 101 to 104 are hereinafter referred to as the "base databases" (in other words, referred to also as the "local database") (regardless of the distinction between the internal storage device 1008 and the external storage device 1004), and the database of the common server 130 is hereinafter referred to as the "common database" (regardless of the distinction between the internal storage device 208 and the external storage device 204). If the CPU 201 has determined in step S303 (inquiry recognition step) that it can respond to the inquiry from the customer by using the base databases, it proceeds to step S304, and searches the base databases for a response (reply) to the inquiry from the customer.

For example, when the customer would like to inquire about a service base for XX Printer (PRN-056), the base databases are searched for a list of service bases (addresses, contact points, e-mail addresses) which can cope with maintenance and repairing of XX Printer (PRN-056).

The detected response to the inquiry is displayed by the information processing device or portable terminal of the customer.

When the inquiry is input in a natural language, the base databases are searched (natural language search) about a grammar, etc., by using the natural language, and an optimal response is found.

In step S303 (inquiry recognition step), if the CPU 201 has determined that it can respond to the inquiry from the customer by using the common database, in step S307, the inquiry is transmitted from the local server 101, 102, 103, or 104 to the common server 130 through the communication link network 110.

Figure 8:
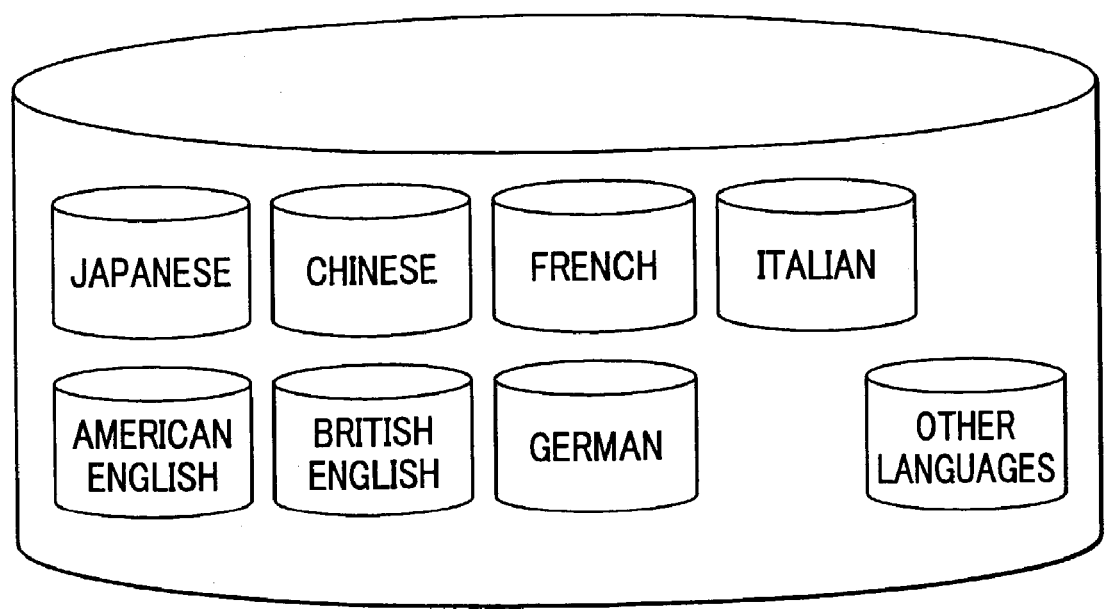
FIG. 8 is a schematic illustration of databases in a common database which store responses in languages to an inquiry.

In step S308, after receiving the inquiry from the local server 101, 102, 103, or 104, the common server 130 analyzes the received inquiry to identify the language used therein. Normally, the received inquiry is analyzed to identify the language used therein in such a manner that language information added to a portion of the inquiry from the local server 101, 102, 103, or 104 is used as an identifier. However, an identifying (analyzing) method is not limited thereto. FIG. 8 is a schematic illustration of databases in the common database which store responses in languages to inquiries.

The common database includes databases of various languages. The contents of each database are common, although the expression form in the database differs depending on each language. For example, the word "purinta" in the Japanese database corresponds to the word "printer" in the English database and to the word "drucker" in the German database.

The manager of the common database does not need to be the manager of a homepage but may be anybody. In other words, the manager of the common database and the manager of the homepage can independently perform operations. This enables efficient administration of responses to inquiries.

In step S309, the database corresponding to the language identified (analyzed) in step S308 is searched for a response (reply) to the inquiry from the local servers 101 to 104.

For example, when the customer inquires about a printer driver for XX Printer (PRN-056), the database is searched for the following:
latest printer driver information;
connectivity between the printer driver and the apparatus;
a method for downloading the printer driver; etc.

In step S311, the response (reply) retrieved in the common server 130 is transmitted to the local server 101, 102, 103, or 104.

The response (reply) retrieved in the common server 130 is displayed on the display screen of the information processing device or portable terminal of the customer similarly to the case of searching the local server 101, 102, 103, or 104.

The above steps constitute the flow of the main processing in this embodiment. The following describes (1) a determination method and (2) the common database which are features of this embodiment.

(1) Determination Method

A process that determines which of the base database and the common database is to be used to respond to an inquiry from the customer is described below.

Figure 11:
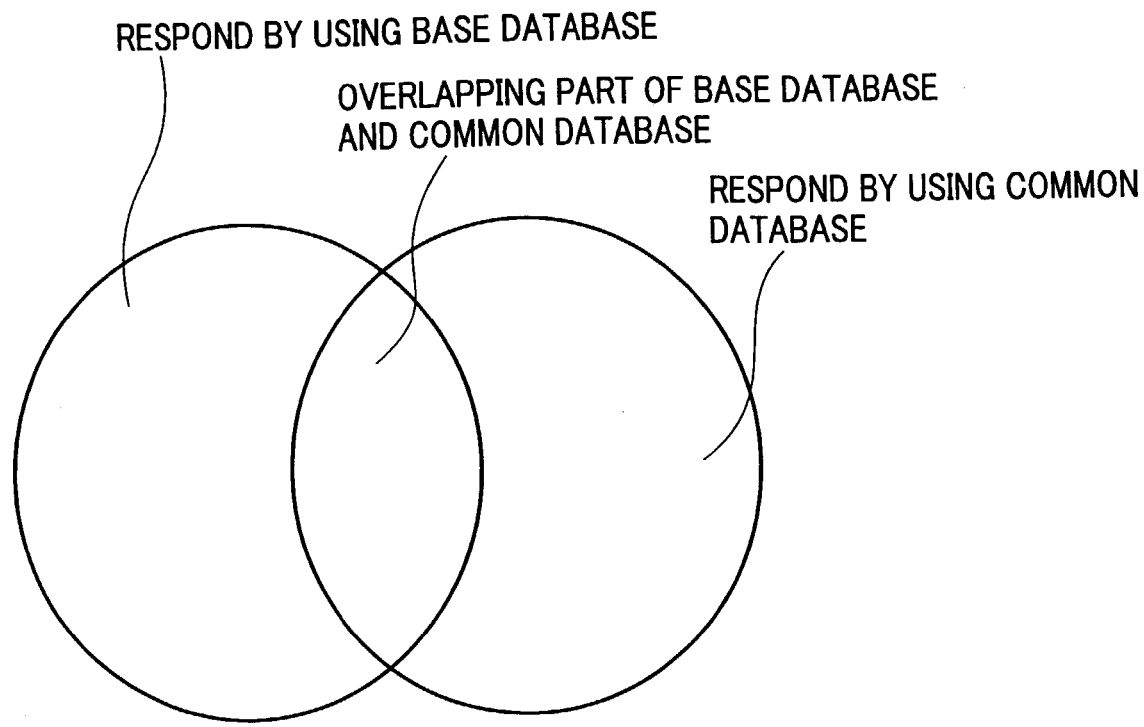
FIG. 11 is a schematic illustration of the contents of a base database and a common database.

FIG. 11 is a schematic illustration of the contents of the base database and the common database. As FIG. 11 illustrates, there is an overlapping part in content between the base database and the common database. The overlapping part indicates that both databases each have a response (reply) to a single inquiry. When both databases have identical responses (replies), no problem occurs. However, when both databases have different responses (replies), the problem is which database should be used to display the response (reply).

Accordingly, as described below, it is determined which database is used to respond (reply) to the inquiry.

The manager of the homepage beforehand determines which database is to be used in the case of receiving an inquiry which matches responses in the overlapping part. However, when the customer is not satisfied with the response, the customer may inquire by using another means (e.g., e-mail).

Accordingly, each local server counts the number of times the customer inquires by using another means when being not satisfied with responses. When the counted number of inquiries exceeds a predetermined number, the database in use is switched to another database.

Figure 12:
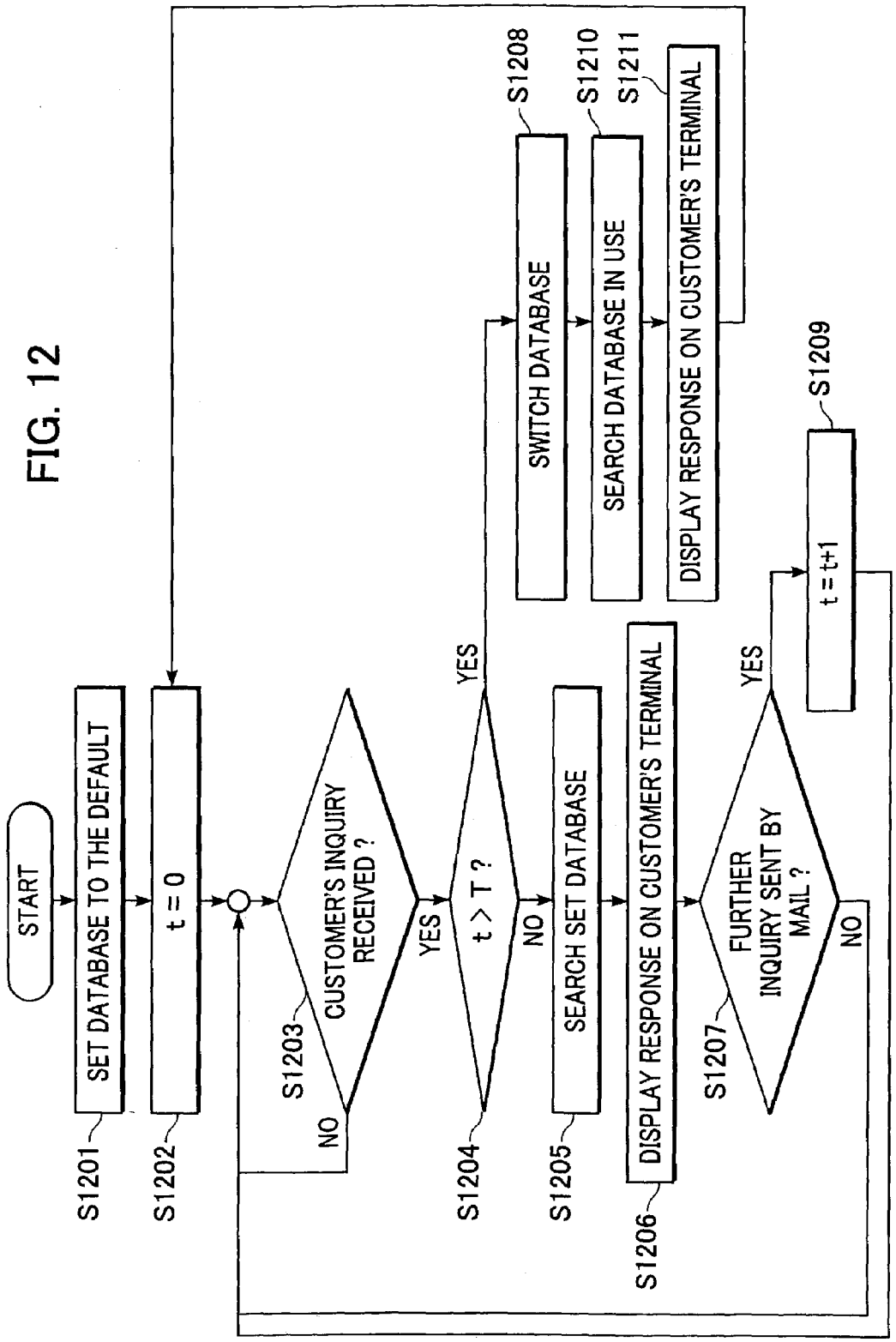
FIG. 12 is a flowchart showing a process for automatically switching databases.

FIG. 12 is a flowchart showing a process for automatically switching databases.

In step S1201, the manager sets a database to the default. Information on the setting (selection) is stored in the RAM 206 in one local server. In this embodiment, the base database is set as the default database.

In step S1202, parameter t is set to zero and is stored in the RAM 206. Parameter t represents the number of times (an accumulated number of times or the number of customers) a customer uses another means to obtain other information after viewing the displayed information, as described later.

In step S1203, an inquiry from a customer is awaited.

In step S1204, when the inquiry from the customer is received, the CPU 206 compares parameter t with threshold value T stored beforehand in the RAM 206, and proceeds to step S1205 if parameter t is less than threshold value T.

In step S1205, the base database is searched for a response to the inquiry from the customer. In step S1206, the retrieved response is transmitted to the customer terminal and is displayed on its displaying unit.

After the customer receives the retrieved response, when the customer needs further information (e.g., when being not satisfied with the response), the customer tries to obtain the information by using other means. The "other means" include e-mail and an Internet telephone. The e-mail or Internet telephone is displayed as a link on the response-displayed homepage. For example, for an inquiry by e-mail, an e-mail address displayed on the homepage is used. When an inquiry is received from the customer through the email address, the CPU 201 in the local server adds one to parameter t (steps S1207 and S1209). When no further inquiry is received during a predetermined time, an inquiry from the next customer is awaited (step S1203).

In step S1204, when parameter t is not less than threshold value T, the CPU 201 proceeds to step S1208 and switches to another database for search. The database is searched for a response to the inquiry (S1210), and is transmitted and displayed in the customer terminal (S1211). The CPU 201 returns to step S1202, and the parameter is reset.

As described above, by counting the number of times a customer further inquires, and switching databases when the number of times exceeds a predetermined threshold value, more necessary information can be provided to the customer.

By setting threshold value T which is common in a single inquiry responding system, a common number t of times may be counted.

In addition, unique threshold values T and numbers of times by homepage being viewed, by customer's origin of access (e.g., countries identified based on domains, etc.), by inquiring method (e.g., e-mail, Internet telephone, etc.), or by time zone may be set. This setting enables appropriate switching of databases in response to an individual request.

(2) Common Database

The common database is managed by the manager of the homepage and cannot be changed by any person except an authorized person (registered person). As described above, the common database stores easy troubleshooting, a manual, etc. These data contents have different expression forms although they are common in regions.

Figure 9:
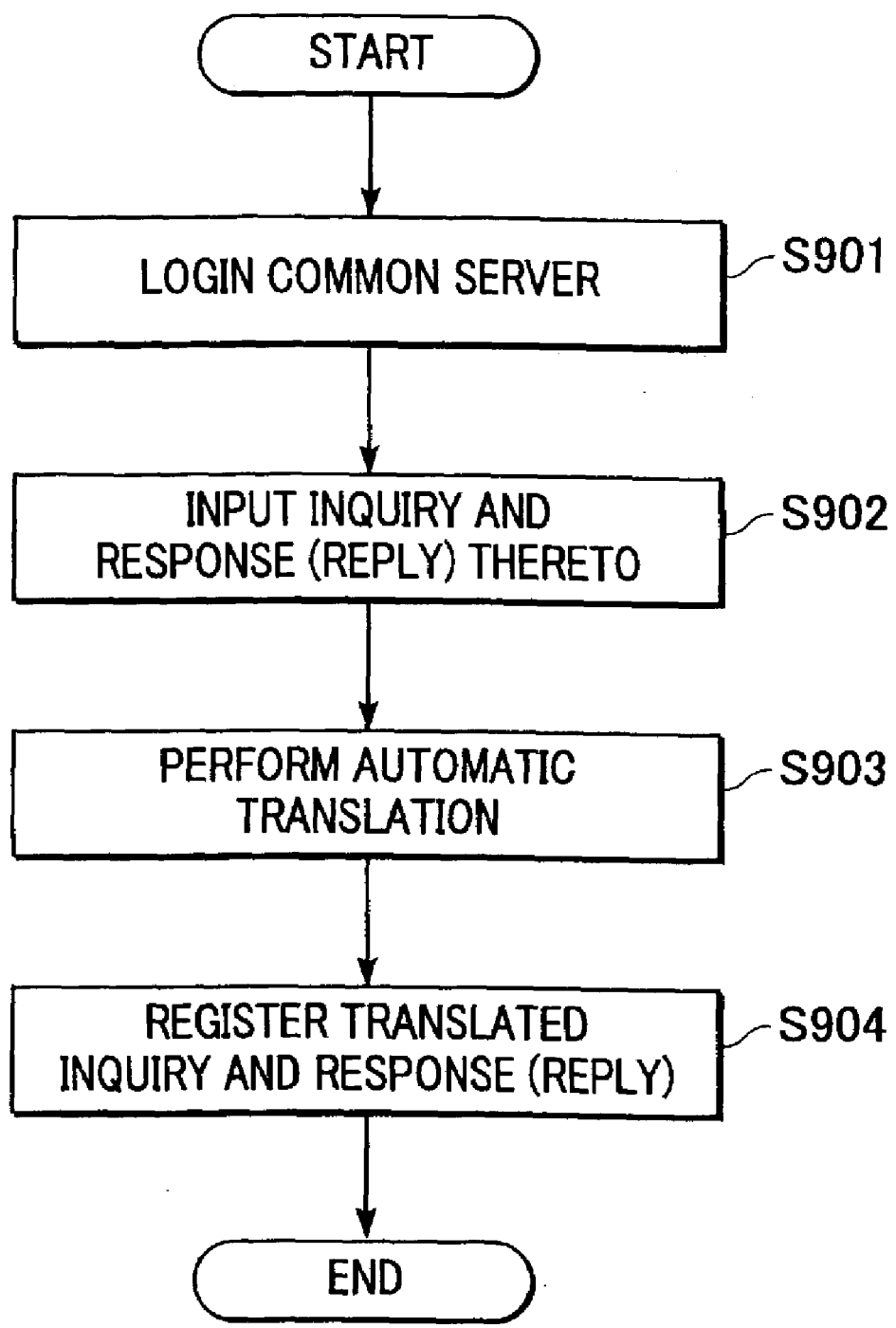
FIG. 9 is a flowchart showing a process for registering new data in a common database.

FIG. 9 is a flowchart showing a process for registering new data in the common database.

In step S901, a terminal in a certain country in FIG. 1 logs in the common server 130. The term "login" here means that, by using some means (e.g., a password) of authentication, the common database in the common server 130 is controlled to have an operable (changeable) state.

After the login, in step S902, the registrar inputs an inquiry and a response (reply) thereto from an information processing device of the registrar. The input information is transmitted to the common server 130 through the communication link network 110. The registrar may input the inquiry and the response (reply) thereto by directly operating the common server 130 without using the communication link network 110. The language for input is not limited to Japanese but may be, for example, English or French. Although the terminal in Japan is used for input, there is no restriction in which the registrar must only input information in Japanese.

In step S903, the input inquiry and response (reply) thereto are automatically translated into languages by the common server 130. For example, when the word "printer" is input in Japanese in step S902, the input word is automatically translated into the languages in FIG. 8 other than Japanese.

In step S904, the translations in the languages of the inquiry and response (reply) thereto are registered in the databases corresponding to the languages.

This system for receiving an inquiry and responding thereto can yield the following advantages:

By providing a common database separately from a base database, the operation of repeatedly inputting data whose content is unchanged, such as a manual, can be reduced;

A base database can rapidly cope with updating, etc., of the contents of a database in each region;

By providing means of determining which of a base database and a common database can respond to an inquiry from a customer, the customer can have a service without being aware of the distinction between the base database and the common database;

Since data in a common database is automatically translated into languages when being manipulated (changed), a registrar does not need to have a good command of other languages, and the entire structure of the system is made simple (content repetition is eliminated) to facilitate management by a manager; and Although the case of having overlapping databases in each base has a difficulty in simultaneous version upgrading of common content due to an effect such as a time difference, provision of a common database eliminates this problem.

According to the present invention, by providing a common database and a base database, an inquiry from a customer can be efficiently processed and system management can be facilitated.

As many apparently widely different embodiments of the present invention can be made without departing from the spirit and scope thereof, it is to be understood that the invention is not limited to the specific embodiments thereof except as defined in the claims.

What is claimed is:

1. An inquiry responding apparatus comprising:
   receiving means for receiving an inquiry;
   a first database for storing a response to the inquiry;
   determining means for determining whether or not said first database can be searched for the response to the inquiry;
   searching means for searching said first database for the response to the inquiry when said determining means determines that said first database can be searched;
   transmitting means for transmitting the inquiry to an external information processing device when said determining means determines that said first database cannot be searched;
   second receiving means for receiving a response to the inquiry which is transmitted from the external information processing device; and
   displaying means for displaying one of the response obtained by said searching means and the response received by said second receiving means.

2. An inquiry responding apparatus according to claim 1, wherein the external information processing device includes a second database, and the second database is searched for the response to the transmitted inquiry.

3. An inquiry responding apparatus according to claim 2, wherein:
   the second database stores responses to the transmitted inquiry in a plurality of languages; and
   the external information processing device identifies the language of the transmitted inquiry, uses the identified language to search the second database for the response to the transmitted inquiry, and transmits the obtained response in the identified language.

4. An inquiry responding apparatus according to claim 3, wherein the second database stores the responses to the transmitted inquiry in the languages and
   wherein, when the response in one language among the languages to the transmitted inquiry is updated in the second database, the updated response to the transmitted inquiry in the one language is translated into the languages other than the one language by translating means of the external information processing device for performing interlingual translation, and the translated responses are stored in the second database.

5. An inquiry responding apparatus having at least two databases respectively storing responses to one inquiry, comprising:
   database selecting means for selecting one database from the at least two databases;
   first inquiry-receiving means for receiving an inquiry;
   searching means for searching the selected database for a response to the received inquiry;
   transmitting means for transmitting the response obtained by said searching means;
   second inquiry-receiving means for receiving further inquiries about the transmitted response;
   inquiry-counting means for counting the number of times a further inquiry is received; and
   database changing means for selecting a database other than the selected database when the number of times a further inquiry is received exceeds a predetermined number.

6. An inquiry responding method comprising:
a receiving step of receiving an inquiry;
a determining step of determining whether or not a first database which stores a response to the inquiry can be searched for the response;
a searching step of searching the first database for the response to the inquiry when it is determined in said determining step that the first database can be searched;
a transmitting step of transmitting the inquiry to an external information processing device when it is determined in said determining step that the first database cannot be searched;
a second receiving step of receiving a response to the inquiry which is transmitted from the external information processing device; and
a displaying step of displaying one of the response obtained by said searching step and the response received by said second receiving step.

7. A computer-readable inquiry responding program stored on a computer-readable medium, the program comprising:
a receiving step of receiving an inquiry;
a determining step of determining whether or not a first database storing a response to the inquiry can be searched for the response;
a searching step of searching the first database for the response to the inquiry when it is determined in said determining step that the first database can be searched;
a transmitting step of transmitting the inquiry to an external information processing device when it is determined in said determining step that the first database cannot be searched;
a second receiving step of receiving a response to the inquiry which is transmitted from the external information processing device; and
a displaying step of displaying one of the response obtained by said searching step and the response received by said second receiving step.

* * * * *